United States Patent [19]

Crichton et al.

[11] Patent Number: 6,104,716

[45] Date of Patent: Aug. 15, 2000

[54] METHOD AND APPARATUS FOR LIGHTWEIGHT SECURE COMMUNICATION TUNNELING OVER THE INTERNET

[75] Inventors: Joseph M. Crichton, Poughkeepsie; Peter F. Garvin, Ulster Park; Jeffrey W. Staten, Poughkeepsie, all of N.Y.; Waiki L. Wright, Sunnyvale, Calif.

[73] Assignee: International Business Machines Corporation, Armonk, N.Y.

[21] Appl. No.: 08/828,449

[22] Filed: Mar. 28, 1997

[51] Int. Cl.[7] ..................................................... H04L 12/28
[52] U.S. Cl. ...................................... 370/401; 395/187.01
[58] Field of Search ..................................... 370/401, 402, 370/403, 404, 405; 395/200.01, 200.33, 200.49, 200.56, 200.54, 187.01, 200.55

[56] References Cited

U.S. PATENT DOCUMENTS

| | | | |
|---|---|---|---|
| 5,778,174 | 7/1998 | Cain | 395/187.01 |
| 5,802,320 | 9/1998 | Baehr et al. | 395/200.79 |
| 5,898,830 | 4/1999 | Wesinger, Jr. et al. | 395/187.01 |
| 5,944,823 | 8/1999 | Jade et al. | 713/201 |

FOREIGN PATENT DOCUMENTS

| | | |
|---|---|---|
| 0 713 311 A1 | 5/1996 | European Pat. Off. . |
| 0 743 777 A2 | 11/1996 | European Pat. Off. . |
| 2 317 539 | 3/1998 | United Kingdom . |
| 2 318 031 | 4/1998 | United Kingdom . |
| WO 97/16911 | 5/1997 | WIPO . |
| WO 98/18248 | 4/1998 | WIPO . |

OTHER PUBLICATIONS

David Koblas and Michelle R. Koblas, "Socks", UNIX Security Symposium, USENIX Association (199_), pp. 77–83.

M. Leech, M. Ganis, Y. Lee, R. Kuris, D. Koblas, and L. Jones, "Socks Protocol Version 5", ftp://ds.internic.net/rfc/rfc1928.txt.

*Primary Examiner*—Valencia Martin-Wallace
*Assistant Examiner*—Kim T. Nguyen
*Attorney, Agent, or Firm*—Whitham, Curtis & Whitham; H. Daniel Schnurmann, Esq.

[57] ABSTRACT

A lightweight secure tunneling protocol or LSTP permits communicating across one or more firewalls by using a middle server or proxy. Three proxies are used to establish an end-to-end connection that navigates through the firewalls. In a typical configuration, a server is behind a first firewall and a client behind a second firewall are interconnected by an untrusted network (e.g., the Internet) between the firewalls. A first inside firewall SOCKS-aware server-side end proxy connects to the server inside the first firewall. A second inside firewall SOCKS-aware client-side end proxy is connected to by the client inside the second firewall. Both server-side and client-side end proxies can address a third proxy (called a middle proxy) outside the two firewalls. The middle proxy is usually started first, as the other two end proxies (server and client) will initiate the connection to the middle proxy some time after they are started. Since the middle proxy is mutually addressable by both inside proxies, a complete end-to-end connection between the server and client is established. It is the use of one or more middle proxies together with the LSTP that establishes the secure communications link or tunnel across multiple firewalls.

9 Claims, 10 Drawing Sheets

METHOD AND APPARATUS FOR LIGHTWEIGHT SECURE COMMUNICATION TUNNELING OVER THE INTERNET

BACKGROUND OF THE INVENTION

1. Field of the Invention

The present invention generally relates to packet switched network communications and, more particularly, a method and apparatus which provides the ability to allow a TCP/IP client situated outside of an organization's "firewall" to address a server inside the same firewall, even when the firewall is configured to not allow outside clients to address the inside server.

2. Background Description

The Internet is a collection of networks throughout the world which facilitates the sharing of resources among participating organizations, including government agencies, educational institutions and private corporations. These networks use the Transmission Control Protocol/Internet Protocol (TCP/IP) protocol suite and share a common address space. Thus, computers on the Internet use compatible communications standards and share the ability to contact each other and exchange data. Users of the Internet communicate mainly via electronic mail (e-mail), via Telnet, a process that allows users to log in to a remote host, and via implementations of the File Transfer Protocol (FTP), a protocol that allows them to transfer information on a remote host to their local site.

Security is a major concern when connecting a network, such as a local area network (LAN) to the Internet. One of the more important concerns is intruders attempting to gain access to local hosts. A common method for preventing these types of intrusions is to install a so-called "firewall" which is a secure single point of attachment to the Internet. This single point of attachment takes the form of a firewall host which allows only certain traffic to pass through as specified by the firewall administrator. In a typical firewall host implementation, a user wanting to transfer a file on a host in the LAN to an external host via the Internet first transfers the file to the firewall host and then logs into the firewall and transfer the file to the external host. While this procedure provides a high level of security for a single user, maintaining security becomes difficult as the number of users requiring access to this host increases. For general information on firewalls, see William R. Cheswick and Steven M. Bellovin, *Firewalls and Internet Security*, Addison-Wesley (1994).

A transport layer proxy architecture, called SOCKS, was created in an attempt to minimize security problems while allowing access by a large number of users. See, for example, David Koblas and Michelle R. Koblas, "SOCKS", *UNIX Security Symposium*, USENIX Association (1992), pp. 77–83, and Ying-Da Lee, "SOCKS: A protocol for TCP proxy across firewalls", http://www.socks.nec.com/socks4.protocol, and M. Leech, M. Ganis, Y. Lee, R. Kuris, D. Koblas, and L. Jones, "SOCKS Protocol Version 5", ftp://ds.internic.net/rfc/rfc1928.txt. In a transport layer proxy architecture, one end system behind the firewall, which is called the client, initiates a session by making a connection to the proxy, which can be thought of as residing on the firewall. The client and proxy use the connection to exchange messages negotiating session setup information such as authentication or proxy request (e.g., the foreign host to connect to for a firewall proxy or the URL (Uniform Resource Locator) to fetch for an HTTP (Hypertext Transfer Protocol) proxy). The proxy then carries out the request, commonly opening a connection to another end-system, typically outside the firewall, which is called the server, as directed by the client. The proxy may exchange session setup information with the server over the connection. After session setup has been completed on both connections, the proxy begins to copy data back and forth between the two connections and does not delete from, add to, or alter the information flowing between the hosts (although it may silently keep a copy of the information, as in the case of HTTP caching proxies).

Often, an employee inside an organization wishes to allow an "outside" client to address his or her "inside" server. In this case, since the employee trusts the outside client, he or she may wish to bypass the controls put in place on the firewall so that the trusted outside client can address the trusted inside server.

SUMMARY OF THE INVENTION

It is therefore an object of the present invention to provide a way to establish secure tunnels through firewalls without changes to the existing firewall software or firewall configuration.

It is another object of the invention to provide for end-to-end privacy and integrity of the communication over the channel.

It is a further object of the invention to provide for mutual authentication of the users establishing a secure channel.

It is yet another object of the invention to provide for login/password-based protocols which permit a private delivery of the user ID and password to the remote server.

According to the invention, there is provided a lightweight secure tunneling protocol or LSTP which permits communicating across one or more firewalls by using a middle server or proxy. More particularly, the basic system uses three proxies, one middle proxy and two end proxies, to establish an end-to-end connection that navigates through two firewalls. In this configuration, a server behind a first firewall and a client behind a second firewall are interconnected by an untrusted network (e.g., the Internet) between the firewalls. A first inside firewall SOCKS-aware end server-side proxy connects to the server inside the first firewall. The client inside the second firewall connects to a second inside firewall SOCKS-aware client-side end proxy. Both server-side and client-side end proxies can address a third proxy (called a middle proxy) outside the two firewalls. The middle proxy is usually started first, as the other two proxies (server and client end proxies) will initiate the connection to the middle proxy some time after they are started. Since the middle proxy is mutually addressable by both inside end proxies, a complete end-to-end connection between the server and client is established. It is the use of one or more middle proxies together with an appropriate protocol like LSTP that establishes the secure communications link or tunnel across multiple firewalls.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
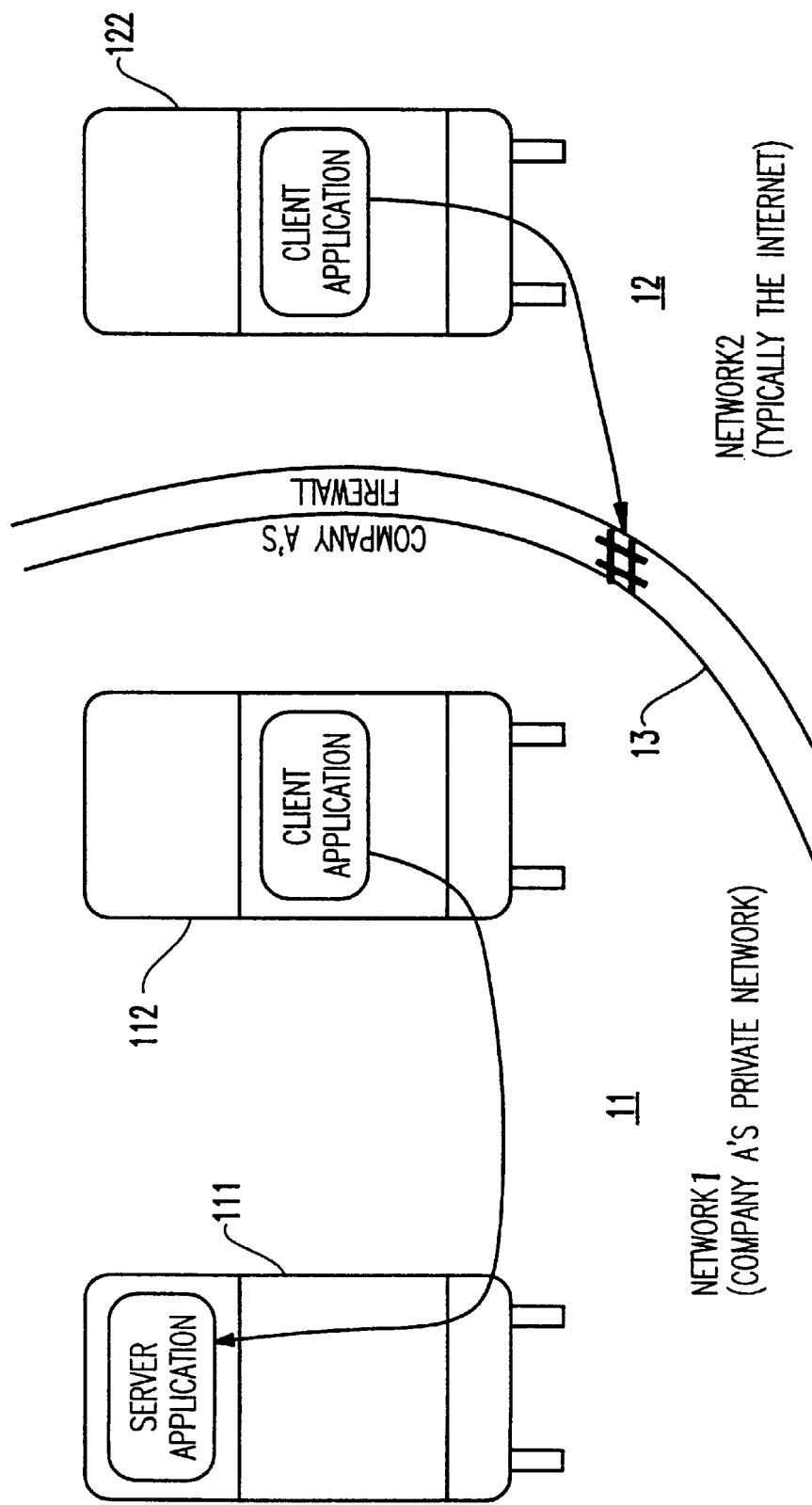
FIG. 1 is a block diagram illustrating the typical interaction between a client application and a server application when the server is behind a firewall.

Referring now to the drawings, and more particularly to FIG. 1, there is shown two networks 11 and 12 separated by a firewall 13. The firewall 13 is used to guard the first network 11 against malicious activity originating from outside the firewall. Network 11 is, in this illustration, Company A's private network, and network 12 is typically the Internet. In this example, network 11 is represented by a server 111 running a server application and a client 112 running a client application. The client application running on client 112 behind the firewall 13 can address the server application running on server 111, but a client application running on client 122 outside the firewall 13 cannot address the server application running on server 111 since this connection is blocked by the firewall. That is, the purpose of the firewall 13 is to guard the computer resources of Company A, in this case, network 11 which may comprise many servers and clients connected together on a local area network (LAN).

Figure 2:
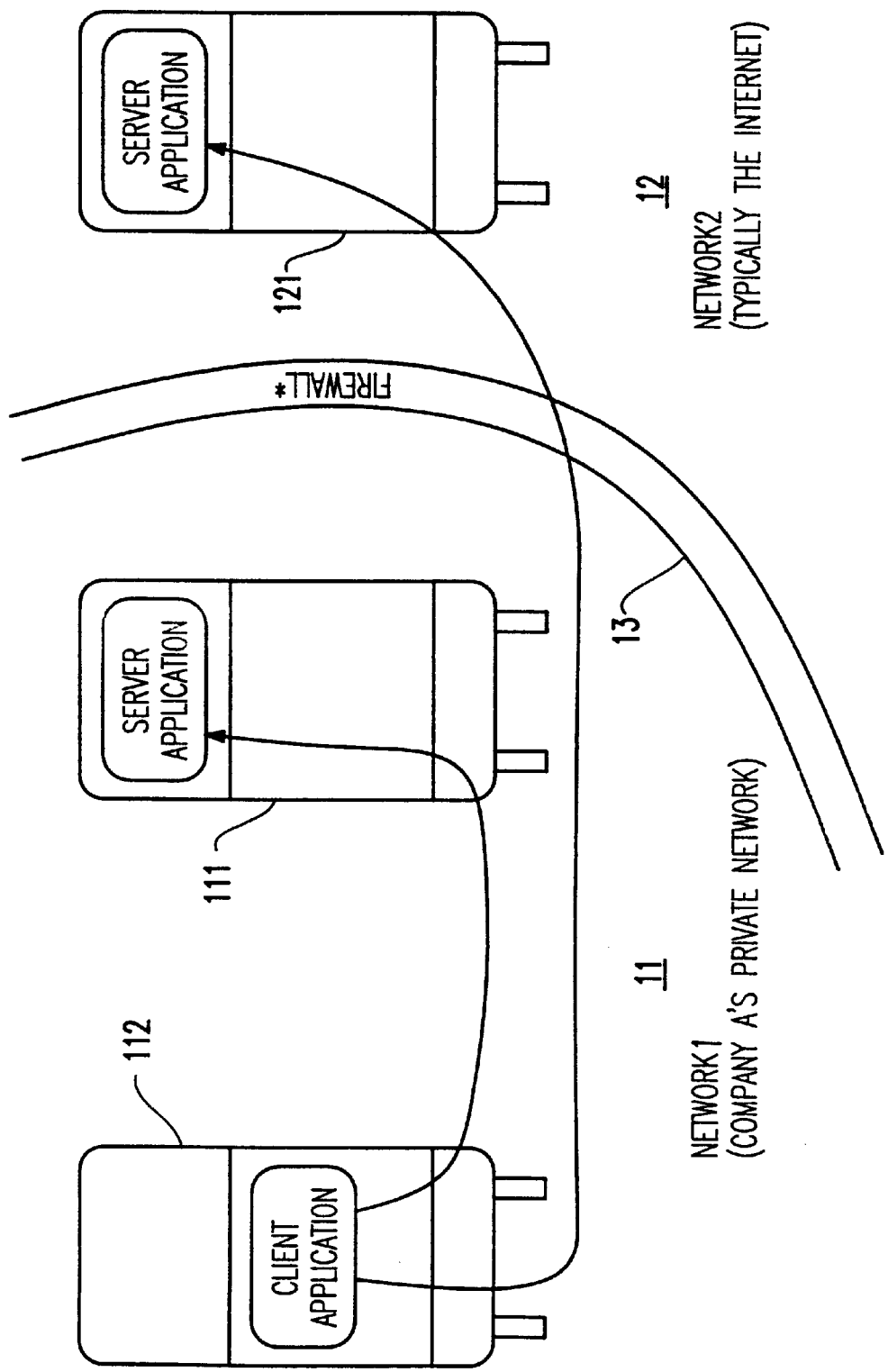
FIG. 2 is a block diagram illustrating the typical interaction between a client application and a server application when the client is behind a firewall.

In FIG. 2, there is shown a similar arrangement except that there is a server 121 running a server application in network 2. As in FIG. 1, the client application running on client 112 can still address the server application running on server 111. If enabled to allow connections from inside to outside, the firewall 13 will also allow the client application running on client 112 to connect to the server application running on server 121 outside the firewall 13. The common software package called SOCKS mentioned above enables firewalls to make connections from inside to outside as shown in FIG. 2.

FIG. 3 again shows two networks but this time the second network 14 is Company B's private network which is behind a second firewall 15. Thus, firewall 15 is designed to protect Company B's computer resources from malicious activity originating from outside firewall 15. In this illustration, a client application running on a client 142 behind firewall 15 may attempt to address the server application running on server 111 behind firewall 13 via the Internet 12. However, while firewall 15 may have the SOCKS capability to allow client application running on client 142 to connect outside the firewall 15, firewall 13 prevents the connection to the server application running on server 111.

Figure 3:
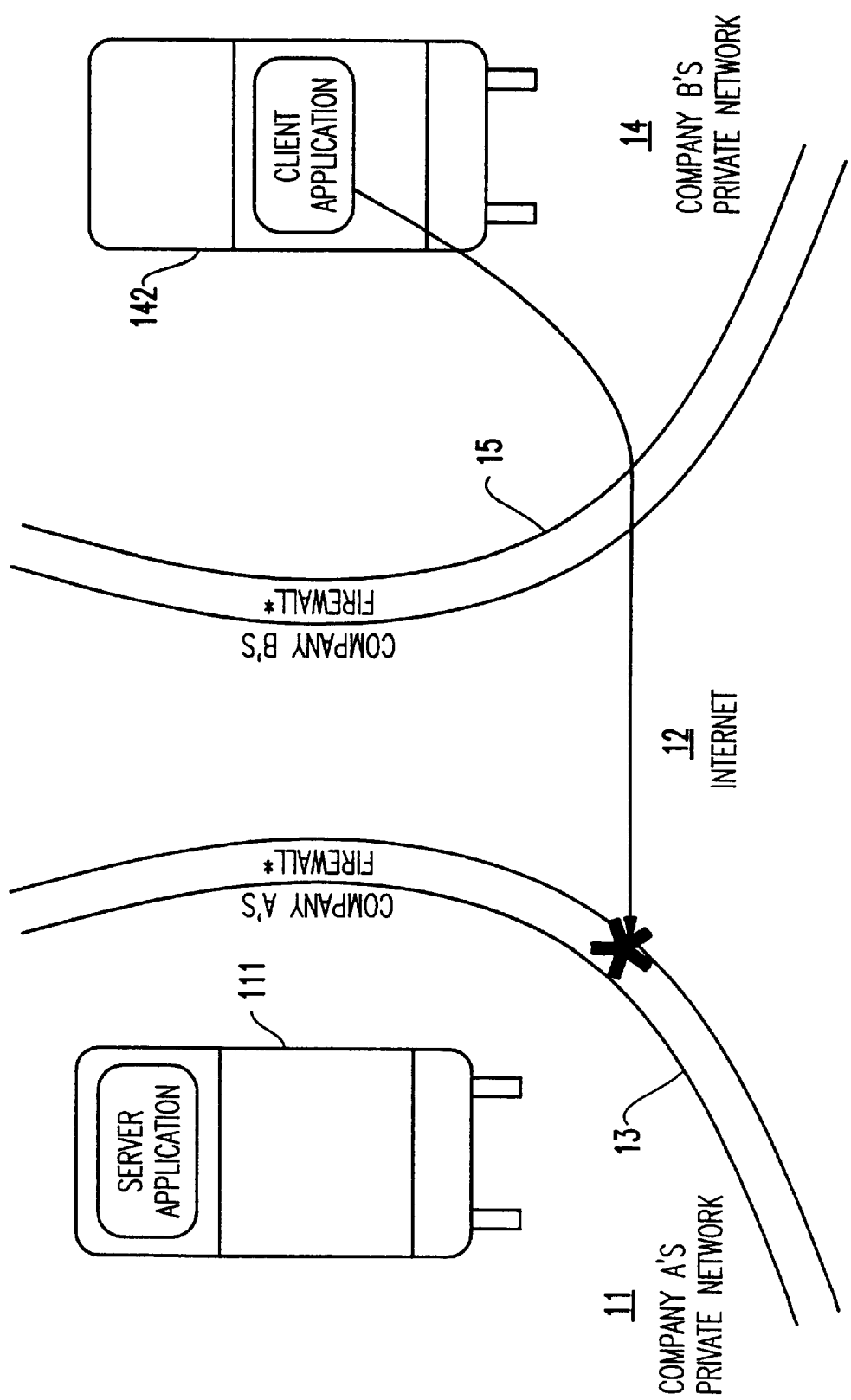
FIG. 3 is a block diagram illustrating a typical network configuration between two companies or organizations each having networks behind firewalls.

Often, an employee inside an organization wants to allow an "outside" client application to address an "inside" server; e.g., to allow the client application running on client 142 to address the server application running on server 111 in FIG. 3. In this case, the employee trusts the outside client application and wishes to bypass the controls put in place on their company's firewall that prevent the trusted outside client from addressing the inside server. This invention provides a solution for this situation.

The invention will be described, without loss of generality, in terms of an implementation in the X Windows System. The X Windows System is a standardized set of display-handling routines, developed at MIT for UNIX workstations, that allow the creation of hardware-independent graphical user interfaces (GUIs). In the example described first, two firewalls are addressed. The initial implementation builds on the SOCKS package which enables SOCKS-aware programs inside a SOCKS gateway to connect to servers outside the SOCKS gateway.

Figure 4:
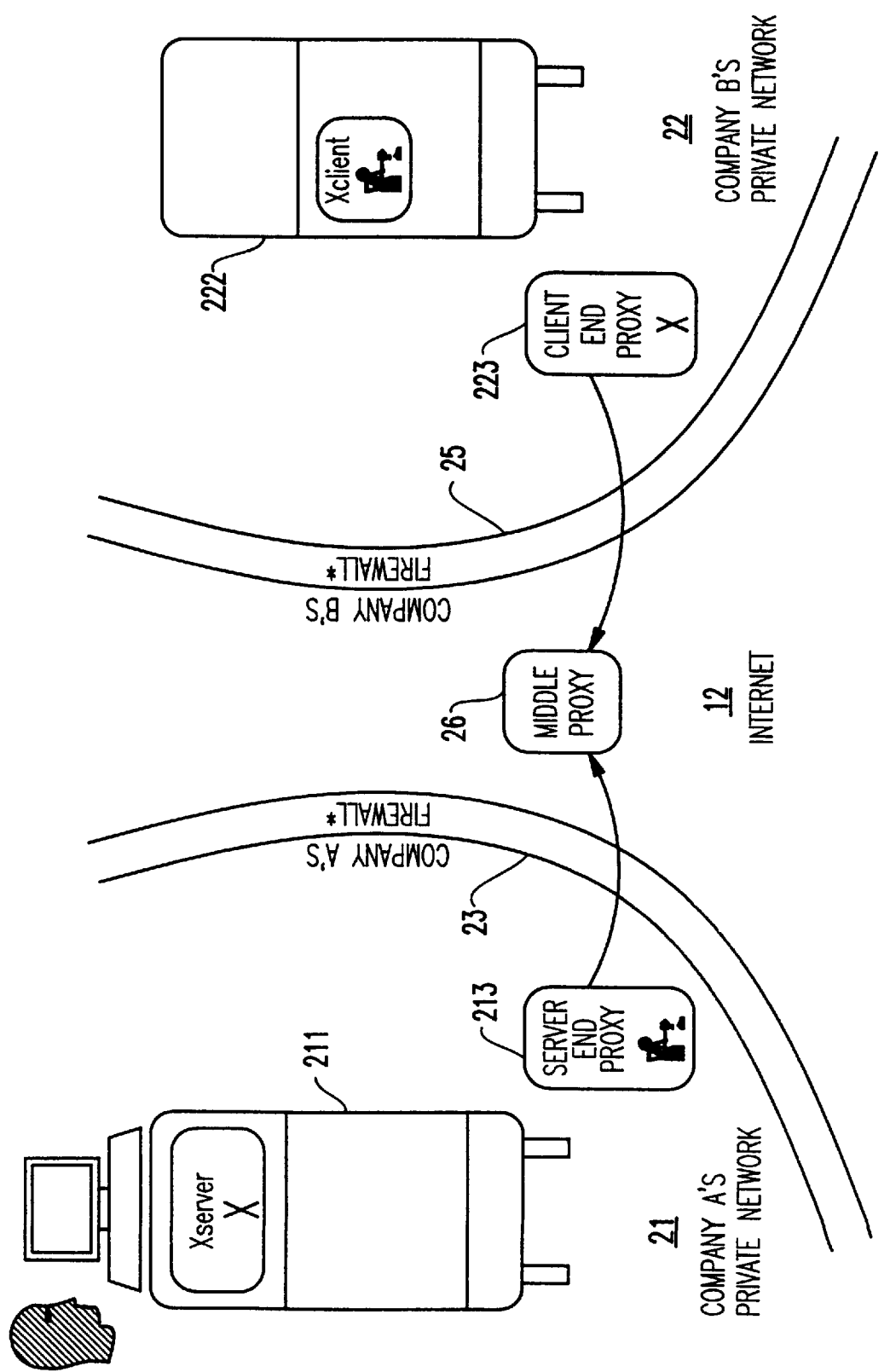
FIG. 4 is a block diagram illustrating the three types of proxies used according to the invention to construct a secure communications channel or tunnel between two companies or organizations.

FIG. 4 shows the three types of proxies used to construct a secure tunnel and their placement in the network configuration according to the present invention. Network 21, Company A's private network or intranet, is protected by firewall 23, and network 22, Company B's private network or intranet, is protected by firewall 25. Behind firewall 23 is an X-server 211, part of Company A's private network, and behind firewall 25 is an X-client 222, part of Company B's private network. Both firewalls 23 and 25 have SOCKS capability to allow "inside" clients to connect to "outside" servers. The X-client 222 has within its addressable domain behind Company B's firewall 25 a client end proxy 223 that has the ability to listen for X protocol. The client end proxy 223 appears as a local X-server to the X-client 222, so no modifications are needed to the X-client 222.

A similar situation exists behind Company A's firewall 23 where a server end proxy 213 exists within the addressable domain of the X-server 211. The server end proxy 213 is able to connect to the X-server 211 just as a real X-client would. The server end proxy 213 appears as a local X-client to the X-server 211 so, again, no modifications are needed to the X-server 211.

A middle proxy 26 is started first, as the end proxies will initiate connections to the middle proxy. The client end proxy 223 and the server end proxy 213 make use of existing capability (e.g., SOCKS) to make requests through a firewall from the inside to the outside. Since the middle proxy 26 is mutually addressable by both end proxies (using SOCKS on each firewall), a complete end-to-end connection between the X-client 222 and the X-server 211 can be established through the middle proxy 26.

The middle proxy 26, which appears as a server to both the client end proxy 223 and the server end proxy 213, is a key feature of the invention. As such, both the client end proxy 223 and the server end proxy 213 can address the middle proxy 26 through their respective firewalls 25 and 23. For cascaded or multiple middle proxies, the middle proxies may actually address other middle proxies as opposed to being addressed by end proxies. The initial connection is made using the standard TCP/IP connection mechanism. Each established connection, no matter which program initiated it, is a TCP/IP connection and is therefore duplex. This invention provides a Lightweight Secure Tunneling Protocol (LSTP) which is used on top of TCP/IP to provide for proper sequencing of tunnel management events. LSTP is "spoken" between the client end, server end and middle proxies not just during tunnel construction, but through out the entire tunnel lifetime.

The triggers for the end proxies 213 and 223 to initiate a connection to the middle proxy 26 is manually controlled by someone who has access to the computer where the end proxies 213 and 223 are running. The end proxies 213 and 223 can establish a connection to the middle proxy 26 anytime after the middle proxy is started. The middle proxy 26 will receive and store the setup information sent to it by the first connecting end proxy.

When the middle proxy has two matching connections, one from a client end proxy 223 and one from a server end proxy 213, the middle proxy 26 will join the two connections and act like a transparent pipe, effectively establishing a connection between the two end proxies. From this time forward, the middle proxy 26 is in a pass through mode, and one end proxy initiates a security handshake with the other end proxy to secure the tunnel.

The X-client 222 can now initiate a connection to and passes data to the client end proxy 223 just as if it were connected directly to the X-server 211. The initial data from X-client 222 causes LSTP messages to flow through the tunnel established by the two end proxies 223 and 213 and the middle proxy 26 which then causes server end proxy 213 to initiate a connection to X-server 211. The data from X-client 222 is then passed through the tunnel and presented to the X-server 211. Neither the X-client 222 nor the X-server 211 have any indication that they are not talking directly to each other. Data flows in both directions; from the X-server 211 to the X-client 222 and from the X-client 222 to the X-server 211. At this point, additional clients could connect to the client proxy and use the same or request a new tunnel connection.

To summarize, the server-side end proxy can connect to the inside X Windows System server and the outside middle proxy, and the X Windows System client can connect to the client-side end proxy which can then connect to the outside middle proxy for the X-client. Due to the fact that an established connection is duplex in nature, and due to transitive closure, the X Windows System client can address the X Windows System server as if there were no firewall (i.e., as if they were on the same addressable network). Those skilled in the art will recognize that the functionality of the end proxies can be increased to allow for other protocols and services. For example, one end proxy could provide both client and server end proxy functionality.

Figure 5:
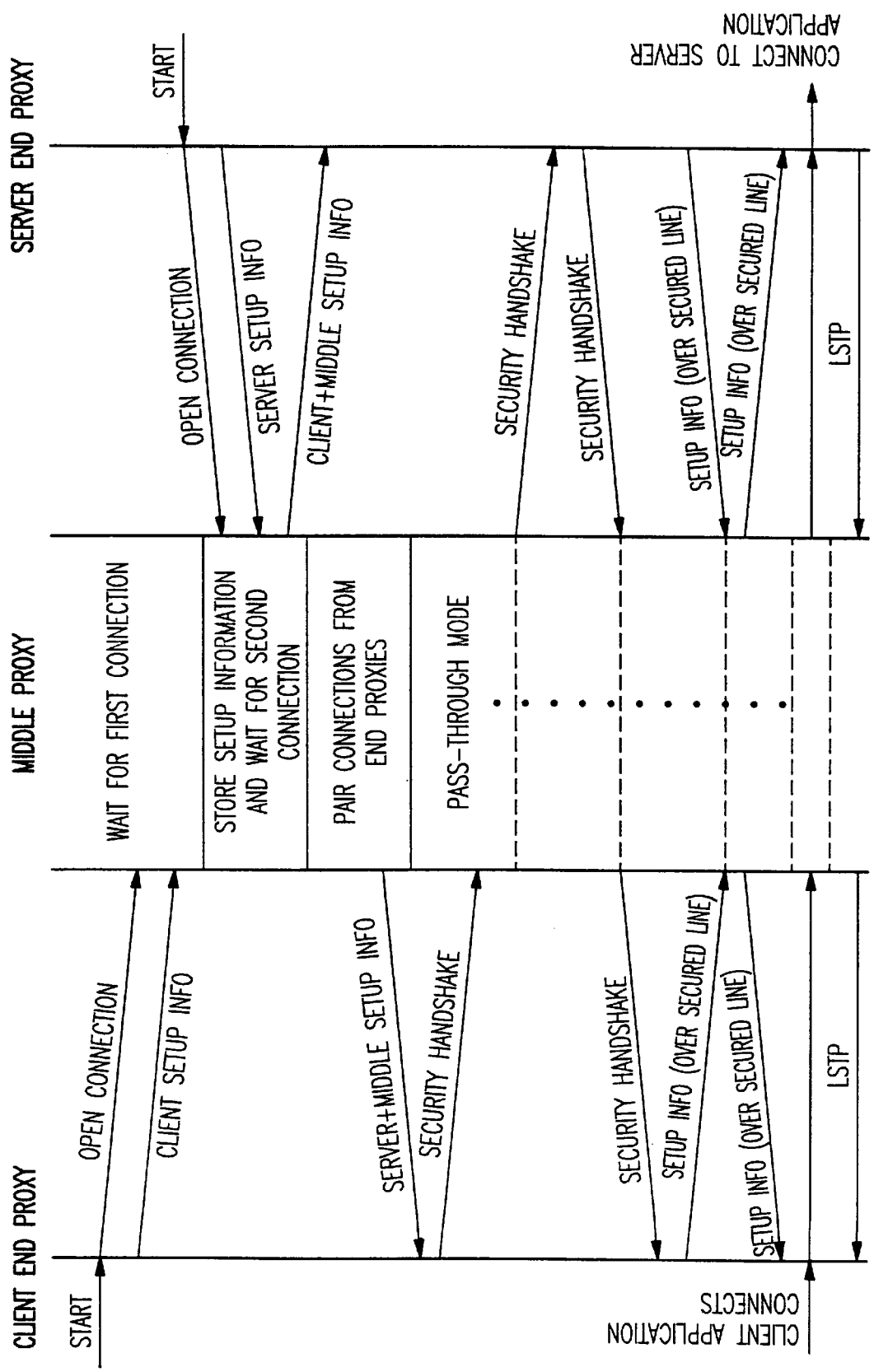
FIG. 5 is a data flow diagram illustrating the interaction between the client, middle and server proxies shown in FIG. 4.

FIG. 5 is a data flow diagram illustrating the interaction between the client, middle and server proxies. The process assumes that the middle proxy has been started and it is waiting for the first connection. The client end proxy is started and opens a connection to the middle proxy and sends client setup information to the middle proxy. "Setup information" is a general term describing two pieces of the LSTP protocol. The middle proxy stores the end proxy setup information and then waits for the second connection. The server end proxy is started and opens a connection to the middle proxy, and the server end proxy sends end proxy setup information to the middle proxy. The middle proxy pairs the connections and transmits server and middle proxy setup information to the client end proxy and client and middle proxy setup information to the server end proxy.

At this point in the process, the middle proxy ceases any active role in the connection and acts as a pass through between the client end and server end proxies. Once the connection has been established, either one of the end proxies can initiate a security handshake. An algorithm in each end proxy uses the setup information to decide which end proxy initiates the security handshake. In FIG. 5, the client end proxy is shown as transmitting a security handshake that is passed to the server end proxy. The server end proxy responds with a security handshake that is passed to the client end proxy. When this security protocol has been accomplished, additional setup information is re-transmitted over a secure line to complete the tunnel construction. Those skilled in the art will recognize that an alternative sequence of events could be used to establish end to end security over the tunnel. With the connection between the client application and the server application completed, and data can securely pass in both directions between the two using a protocol such as the Lightweight Secure Tunneling Protocol (LSTP) described below. As a result, the client and server applications have effectively had their addressability extended.

The server and client proxies 213 and 223 handle (1) authentication, encryption, and integrity, (2) firewall pass through, and (3) data compression. The middle proxy 26 acts as a two way pipe. The server end proxy 213 appears as an X client to the X server 211, while the client end proxy 223 appears as an X server to the X client 222. The server and client end proxies usually reside on the same machine as the X server and X client, respectively.

With this general overview, there are several implementation decisions which were made to implement the secure tunnel between the two networks 21 and 22. First, in the example illustrated, X Windows System clients and servers were used on each tunnel end and, as such, the end proxies are customized to listen for and respond to X protocols. Second, the Secure Sockets Layer (SSL) was chosen as the security protocol to secure the tunnel. SSL provides for data integrity, data privacy, and authenticity of the originating parties. Third, SOCKS was chosen as a mechanism to allow proxies to establish connections from inside the firewall to outside the firewall. Fourth, the Lightweight Secure Tunneling Protocol (LSTP) was developed along with the tunnel to provide a means for formalizing tunnel construction, management, data flow control, and tunnel destruction.

The Lightweight Secure Tunneling Protocol (LSTP) according to the invention is the protocol used between the client proxy 223 and the middle proxy 26 and between the server proxy 213 and the middle proxy 26 shown in FIG. 4. In the preferred embodiment, LSTP includes the following meanings of and sequencing rules for requests and responses used for transferring data between and synchronizing the states of the proxies:

COMMONUNIQUE_INFO—This information allows two end proxies connect at different times to the same middle proxy. The middle proxy knows that these two end proxies should be paired together because they both provided the same common information. The unique information could be used to identify each end proxy user.

TOPOLOGY_EXCHANGE—This is information that describes the topology of the tunnel. Middle proxies append its topology (e.g., name, address, etc.) information to any TOPOLOGY_EXCHANGE it receives and forwards the TOPOLOGY_EXCHANGE downstream to the end proxy. This provides each end proxy with a map of which proxies are participating in the tunnel.

PROPERTY_EXCHANGE—This mechanism allows for end proxies to exchange information about themselves.

CONNECTION_REQUEST—This request allows one end proxy to notify the other end proxy that a client application is requesting tunnel resources to be allocated for use by the client application. Requested resources may include "multiplexed" channels on an existing tunnel connection or new tunnel connections in addition to established tunnel connections.

CONNECTION_ACK and CONNECTION_NACK—These responses allow the proxy receiving a CONNECTION_REQUEST to either accept or deny the request for tunnel resources.

SERVICE_BEGIN_REQUEST—This request allows an end proxy to notify the other end proxy that an application is beginning to send data and therefore use the tunnel resources that have been requested and/or allocated.

SERVICE_BEGIN_ACK and SERVICE_BEGIN_NACK—These responses allow an end proxy to accept or deny an application's request to begin using resources that have been allocated.

SERVICE_DATA—This message is used to send application data between two end proxies. Each client/server application pair has a unique identifier included in its SERVICE_DATA message to allow multiple applications to multiplex their data over one TCP/IP connection.

SERVICE_DATA_PAUSE—This message allows an end proxy to tell the other end proxy to stop sending application data.

SERVICE_DATA_RESUME—This message allows an end proxy to tell the other end proxy to resume sending application data.

SERVICE_FREE_REQUEST—This request allows an end proxy to notify the other end proxy that an application is done and tunnel resources can be freed.

SHUTDOWN—This allows an end proxy to shut down the tunnel gracefully by notifying the other end proxy.

ERROR—This message allows an end proxy to exchange error information.

Figure 6:
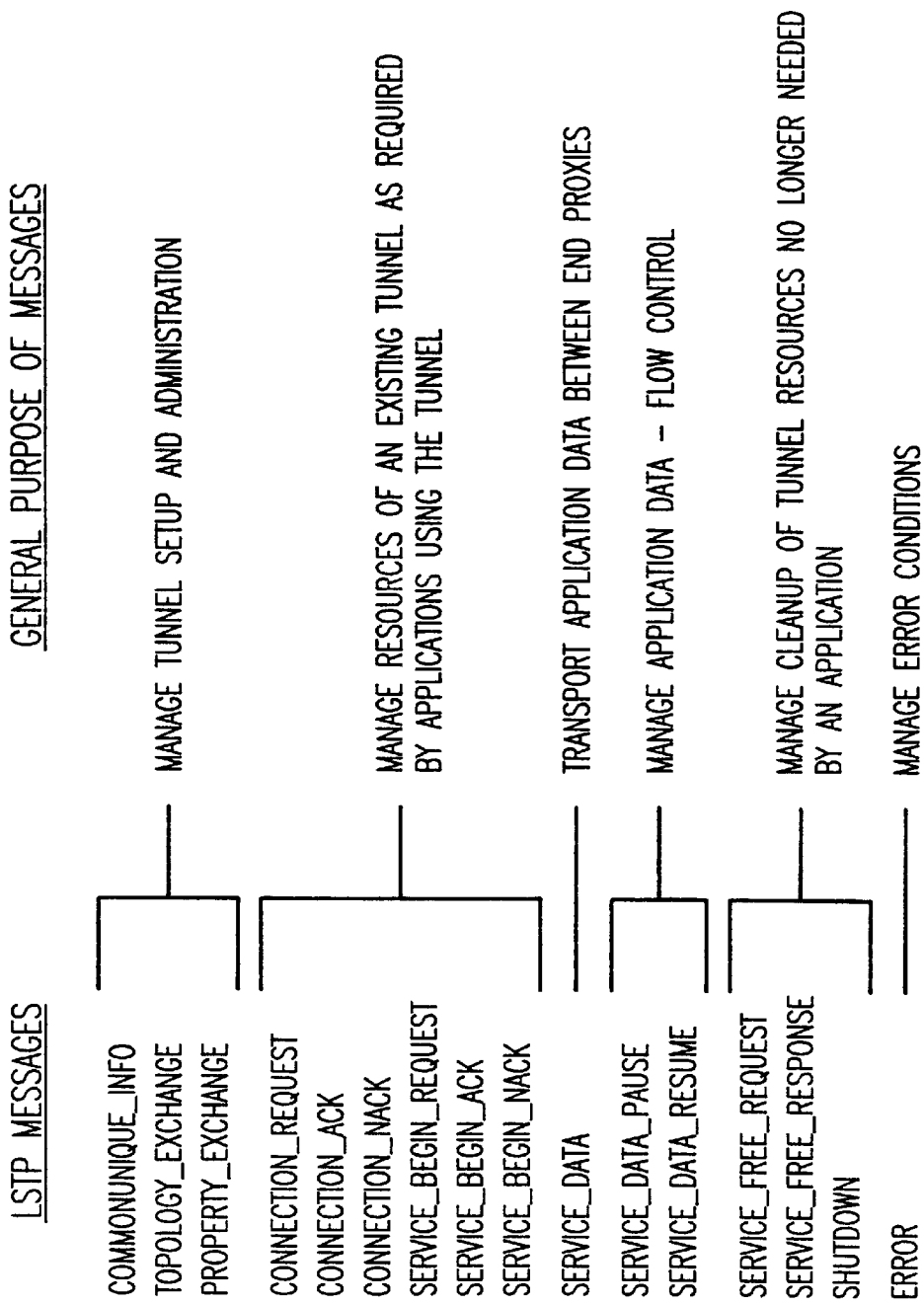
FIG. 6 is a table summarizing the Lightweight Secure Tunneling Protocol (LSTP) according to a preferred embodiment of the invention.

The LSTP is summarized in FIG. 6. Note that the first three messages are used to manage tunnel setup and administration. Specifically, the setup information is comprised of varying combinations of COMMONUNIQUE_INFO and TOPOLOGY_EXCHANGE LSTP messages and is used to manage tunnel connections. The next six messages are used to manage resources of an existing tunnel as required by applications using the tunnel. The next message, SERVICE_DATA, is used to transport application data between end proxies. The next two messages are used to manage application data, that is, flow control. The next three messages are used to manage clean up of tunnel resources no longer needed by an application. Finally, the last message is used to manage error conditions.

This Lightweight Secure Tunneling Protocol (LSTP) was developed to facilitate tunnel resource management and life cycle. Those skilled in the art will recognize that another protocol encompassing similar features and functionality could be created to accomplish the same goal.

Figure 7:
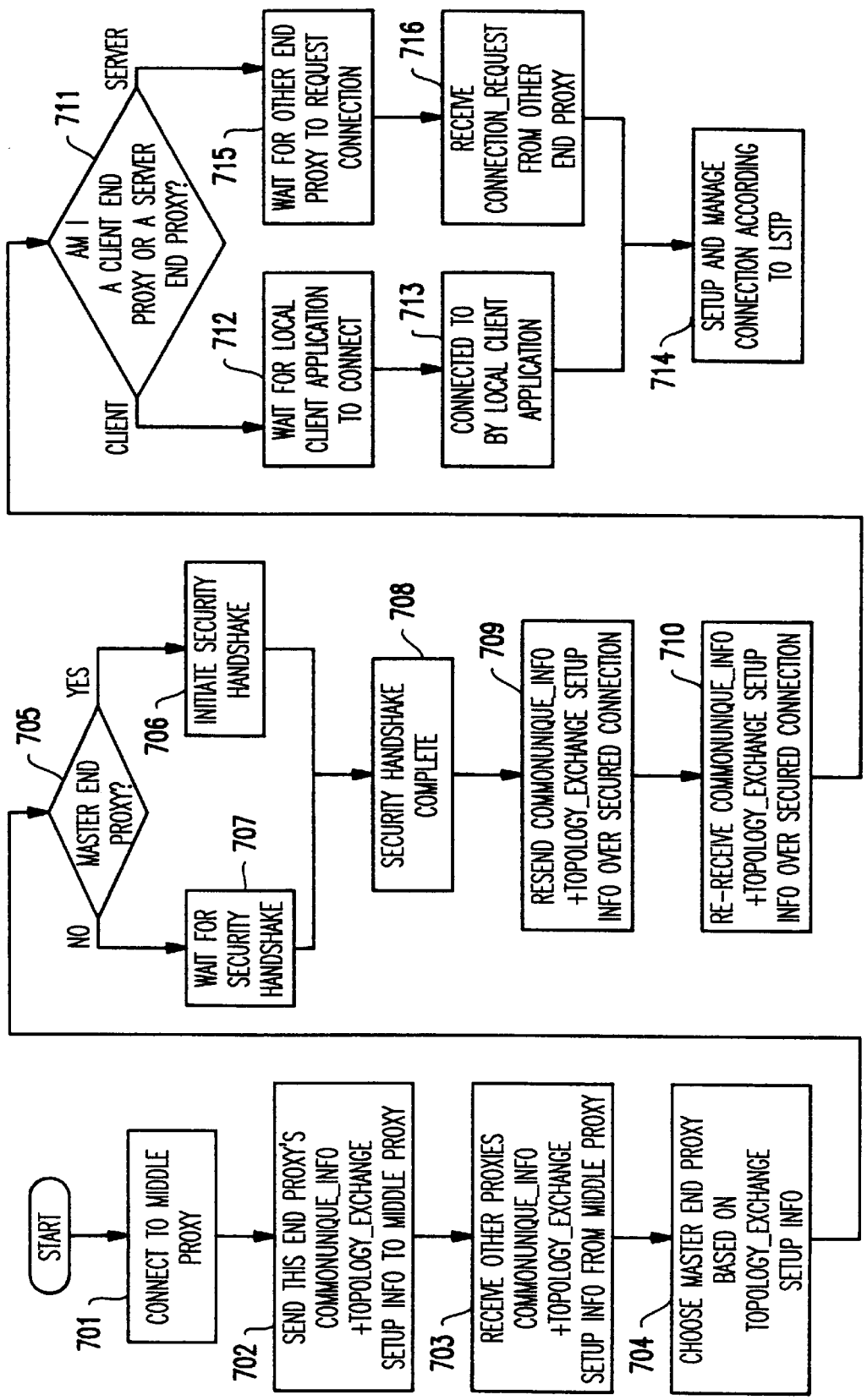
FIG. 7 is a flow diagram of the process performed on an end proxy.

The end proxy flow diagram is shown in FIG. 7. The process begins by connecting to a middle proxy in function block 701. The end proxy then sends its COMMONUNIQUE_INFO and TOPOLOGY_EXCHANGE setup information to the middle proxy in function block 702. Next, the end proxy receives other proxies COMMONUNIQUE_INFO and TOPOLOGY_EXCHANGE set information from the middle proxy in function block 703. A master end proxy is chosen based on the TOPOLOGY_EXCHANGE setup information in function block 704. If this proxy is the master end proxy as determined in decision block 705, then a security handshake is initiated in function block 706; otherwise, the end proxy waits for the security handshake in function block 707. Once the security handshake is complete in function block 708, the end proxy resends the COMMONUNIQUE_INFO and TOPOLOGY_EXCHANGE setup information over the secured connection in function block 709. Then, in function block 710, the proxy again receives the COMMONUNIQUE_INFO and TOPOLOGY_EXCHANGE setup information over the secured connection. If the end proxy is a client end proxy, as determined in decision block 711, the proxy waits for the local client application to connect in function block 712. When the local client application is connected in function block 713, the connection is setup and managed using the Lightweight Secure Tunnel Protocol (LSTP) in function block 714. If, on the other hand, the proxy is a server end proxy as determined in decision block 711, the proxy waits for the other end proxy to request a connection in function block 715. When the CONNECTION_REQUEST message is received from the other end proxy in function block 716, the connection is setup and managed using the Lightweight Secure Tunnel Protocol (LSTP) in function block 714.

Figure 8:
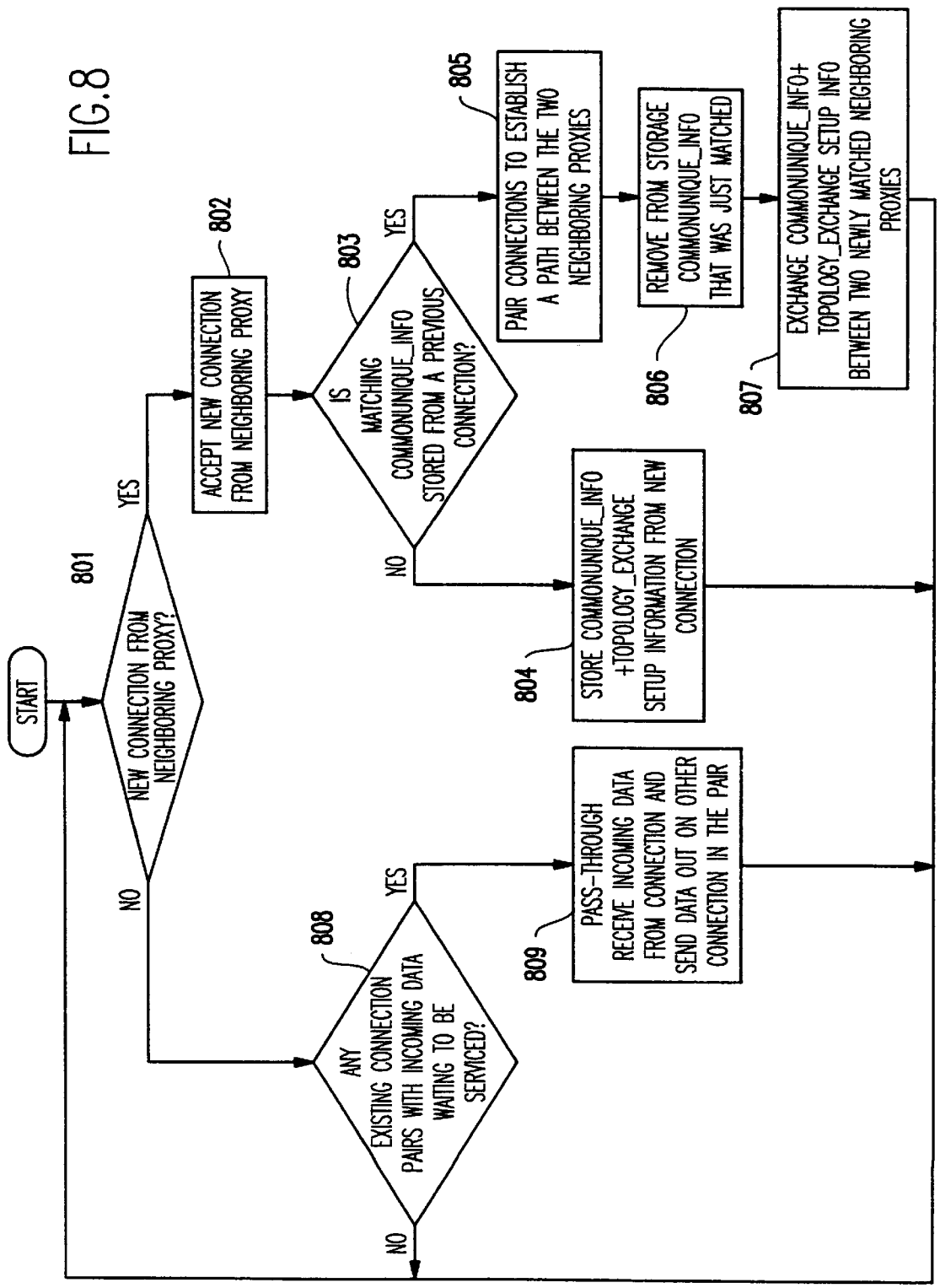
FIG. 8 is a flow diagram of the process performed on a middle proxy.

The middle proxy flow diagram is shown in FIG. 8. The process begins by checking in decision block 801 whether there is a new connection from a neighboring proxy. If so, the new connection is accepted in function block 802, and then a determination is made in decision block 803 as to whether a matching COMMONUNIQUE_INFO message is stored from a previous connection. If not, the COMMONUNIQUE_INFO and TOPOLOGY_EXCHANGE messages are stored at the middle proxy in function block 804 and the process returns to decision block 801 to await a new connection. If upon receiving a new connection, the COMMONUNIQUE_INFO received matches the previously stored COMMONUNIQUE_INFO as determined in decision block 803, the two connections are paired to establish a path between the two neighboring proxies in function block 805. The COMMONUNIQUE_INFO that was just matched is removed from storage in function block 806. The COMMONUNIQUE_INFO and the TOPOLOGY_EXCHANGE setup information are exchanged between the two newly matched neighboring proxies in function block 807, and a return is made to decision block 801. Now if a message is received which is not a new connection from a neighboring proxy, a test is made in decision block 808 to determine if any existing connection pairs with incoming data are waiting to be serviced. If not, a return is made to decision block 801; otherwise, the middle proxy acts as a pass through in function block 809. That is, the middle proxy receives incoming data from one connection and sends the data out on the other connection in the pair of connected end proxies.

Figure 9:
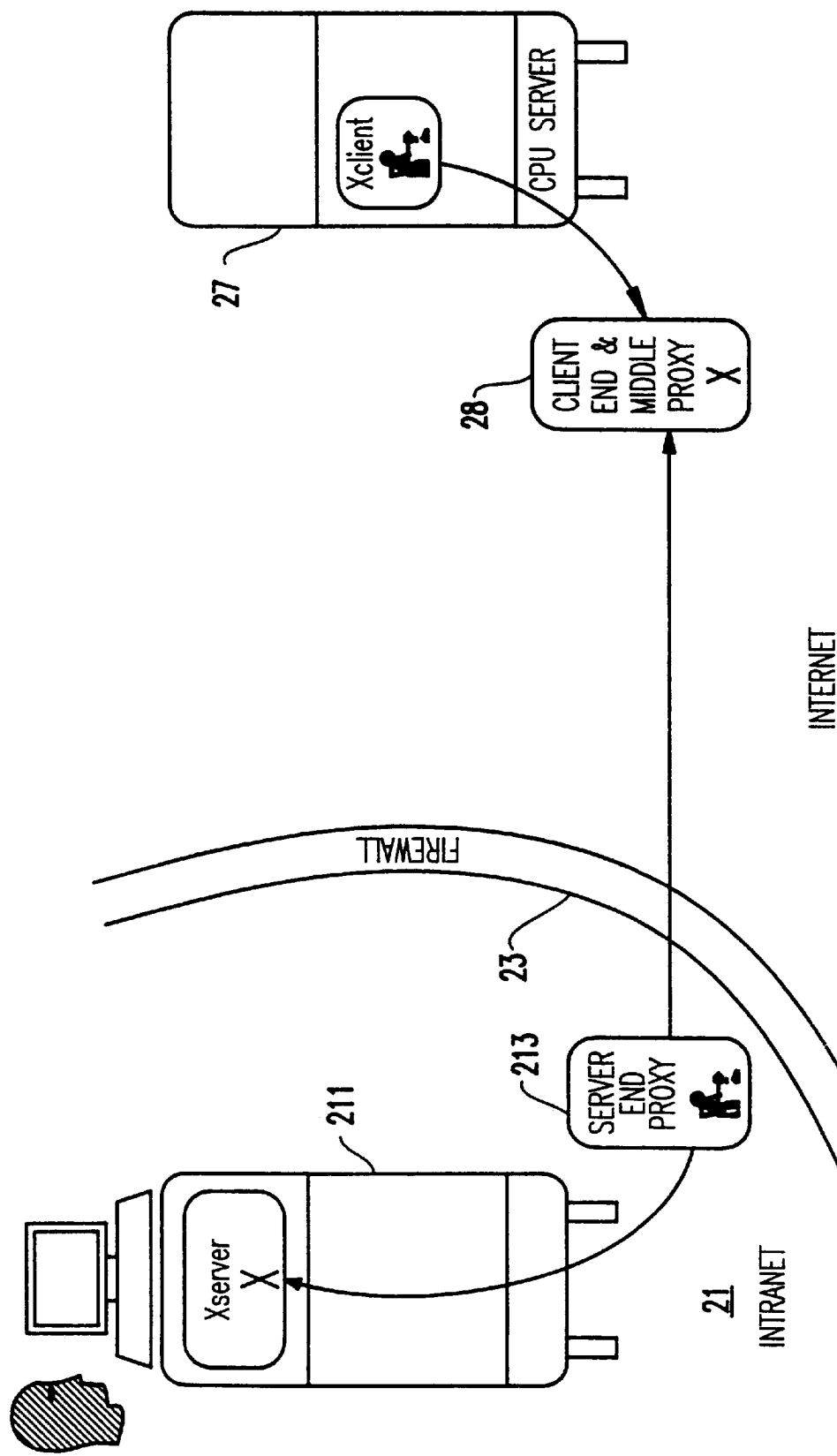
FIG. 9 is a block diagram illustrating an alternative embodiment of the invention where the server proxy connects to the client proxy over a single firewall.

A single middle proxy has been shown to simplify explanation; however, multiple middle proxies can be cascaded, allowing a single tunnel to be constructed across multiple firewalls. In this case, some of the middle proxies are configured to establish a connection with neighboring middle proxies instead of waiting for a second incoming connection. An alternative embodiment addresses the one firewall cases and is shown in FIG. 9. In this case, Company A's private network or intranet 21 includes a X-server 211 and a server end proxy 213 behind the firewall 23. An X-client 27 seeks to address an application running on the X-server 211. A combined client end and middle proxy 28 is used to facilitate this connection. In a similar way, FIG. 9 can be envisioned with the X-client and X-server roles reversed.

The solution according to this alternative embodiment of the invention uses two programs, one which acts as a proxy for the X Windows System client and the other which acts as a proxy for the X Windows System server. The client-side proxy runs on the outside network (i.e., the Internet) and is therefore addressable by the X Windows System client. The outside client-side proxy is also addressable by the inside server-side proxy through the firewall, since most firewalls use the SOCKS package to provide a gateway for inside SOCKS-aware programs to address, and thus connect to, outside services. The process is substantially as described above.

Figure 10:
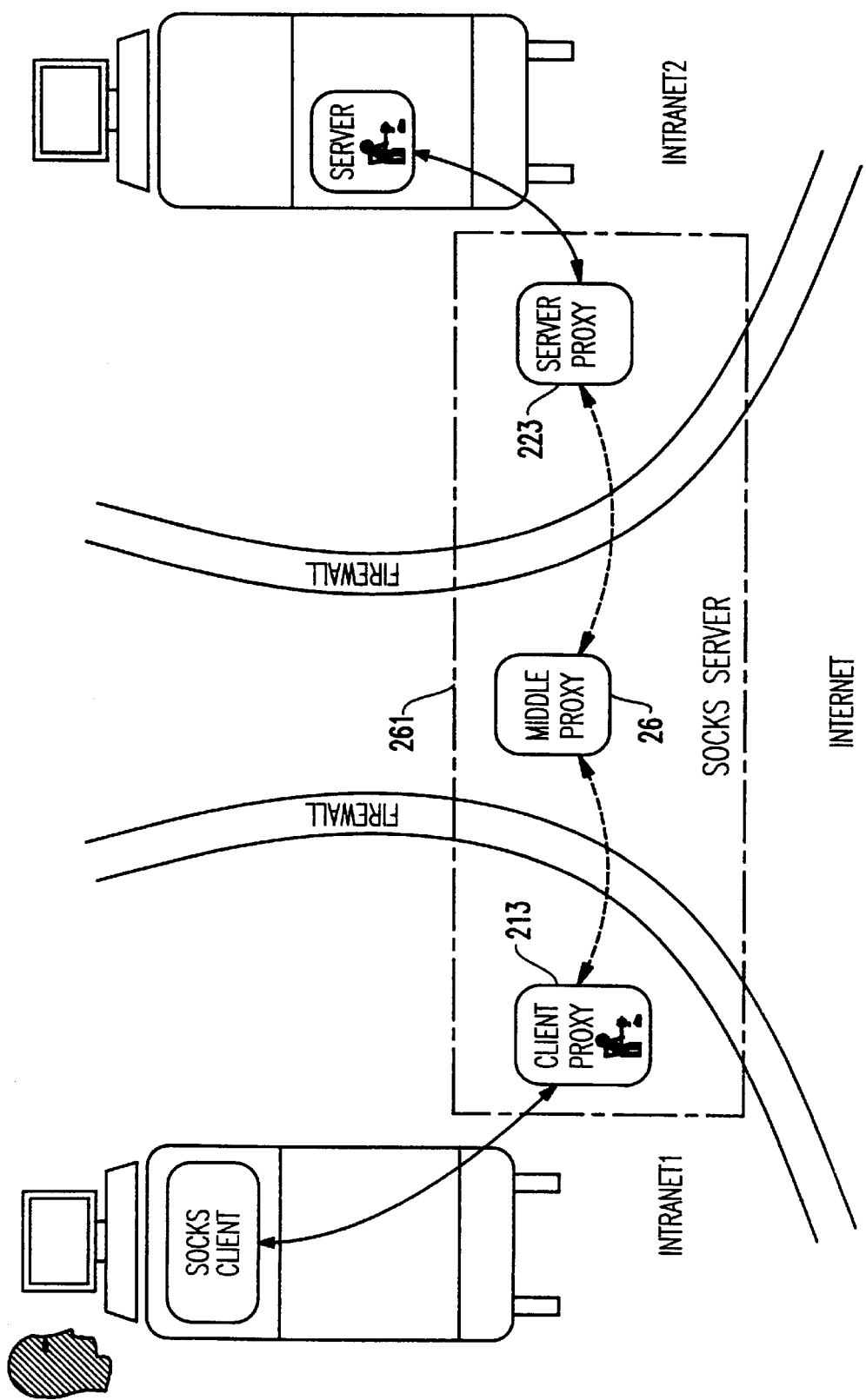
FIG. 10 is a block diagram illustrating another alternative embodiment of the invention in which SOCKS-aware clients allow secure communications over two firewalls.

A further enhancement enables additional SOCKS-aware versions of such Internet programs like FTP, TELNET, HTTP, and SMTP to navigate one or more firewalls through the secure tunnel, as shown in FIG. 10. This improvement adds the functionality of a SOCKS server to the entire tunnel, so that existing SOCKS-aware TCP/IP clients can communicate with servers on the other end of the tunnel, treating the tunnel itself as a single firewall, even though the tunnel may itself be navigating two or more firewalls. After the middle proxy 26 begins to act as a pass through, LSTP is used between the server end proxy 223 and the client end proxy 213. The middle proxy 26 and the two end proxies 213 and 223 constitute a SOCKS server 261 in this embodiment. The two end proxies need to be customized to properly listen for and communicate with SOCKS-aware client applications.

There are many existing clients that are SOCKified like RTELNET, RFTP, RHTTP, etc. (where the "R" prefix usually indicates that the client is SOCKified). These clients expect to connect to a SOCKS server, which is typically on the firewall, and therefore start by sending SOCKS protocol to the SOCKS server and expect the SOCKS server to respond.

By adding SOCKS server capability to the tunnel, the entire tunnel will do the job of a SOCKS server. So instead of using RTELNET to connect to the firewall, a user could use RTELNET to connect to the SOCKS enabled tunnel and travers as many firewalls as that tunnel instance does. Another way to think of the procedure is adding one protocol (i.e., SOCKS) to the tunnel's functionality and gaining an entire suite of protocols like TELNET, FTP, HTTP, etc. Without SOCKS, it would be necessary to modify the tunnel to understand and respond to TELNET, FTP, HTTP, etc. In addition, commercially available products that allow non-SOCKS-aware clients to make requests from SOCKS servers could be used to allow any client application access to SOCKS-aware end proxies.

The invention has been described as running on UNIX workstations. That is, the server, the client, the end proxies, and the middle proxy are all implemented on UNIX workstations. However, there is no reason why the proxies, for example, could not be run on a personal computer (PC) or main frame computer, depending on a specific application and the resources available. It is just a matter of porting code from a UNIX base to another platform. In general, an end proxy, middle proxy, and another end proxy could make up a tunnel where each proxy is running on a different hardware/software platform. The end and middle proxies both place relatively low demands on the resources of the computer they are running on.

It will therefore be apparent that while the invention has been described in terms of preferred embodiments, those skilled in the art will recognize that the invention can be practiced with modification within the spirit and scope of the appended claims.

What is claimed is:

1. A packet switched network communications system comprising:
    a first network including at least one server running a server application;
    a second network including at least one client running a client application;
    a first firewall guarding computer resources of one of the first and second networks and including a software application that enables the first firewall to make connections from inside to outside the first firewall;
    a server end proxy and a server application that are mutually addressable;
    a client end proxy and a client application that are mutually addressable; and
    a middle proxy outside the first firewall and in an untrusted network, the server end proxy making connection to the middle proxy through a first firewall, the client end proxy making connection to the middle proxy and the middle proxy connecting the connections from the server end proxy and the client end proxy to establish a pass through communication tunnel between the client and the server.

2. The packet switched network communications system recited in claim 1 further comprising a second firewall guarding computer resources of the other one of the second and first networks and including a software application that enables the second firewall to make connections from inside to outside the second firewall.

3. The packet switched network communications system recited in claim 2 wherein the server end proxy, the client end proxy and the middle proxy constitute a tunnel having SOCKS server capability, the entire tunnel performing the job of a SOCKS server.

4. In packet switched network communications system including a first network including at least one server running a server application, a second network including at least one client running a client application, a first firewall guarding computer resources of one of the first and second networks and including a software application that enables the first firewall to make connections from inside to outside the first firewall, a server end proxy addressable by the server application, a client end proxy addressable by the server client application, and a middle proxy outside the first firewall and in an untrusted network between the first and second networks, a method of connecting the server end proxy and the client end proxy to the middle proxy through the first firewall and the middle proxy connecting the connections from the server end proxy and the client end proxy to establish a pass through communication tunnel between the client an the server comprising the steps of:
    starting the middle proxy and waiting for a first connection from an end proxy;
    starting the client end proxy and opening a connection to the middle proxy by sending client setup information to the middle proxy;
    storing by the middle proxy the end proxy setup information and then waiting for a second connection;
    starting the server end proxy and opening a connection to the middle proxy by sending end proxy setup information to the middle proxy;
    pairing by the middle proxy the connections of the client end proxy and the server end proxy and transmitting server and middle proxy setup information to the client end proxy and client and middle proxy setup information to the server end proxy; and the middle proxy thereafter acting as a pass through between the client end and server end proxies.

5. The method recited in claim 4 further comprising the steps of:

after pairing by the middle proxy of the connections between the client end and server end proxies, exchanging by the client end and server end proxies security handshakes; and again exchanging setup information between the client end and server end proxies via the middle proxy over the secured line.

6. The method recited in claim 5 further comprising the step of releasing tunnel resources between the client end and server end proxies when data exchange between the client and server over the tunnel have been completed.

7. The packet switched network communications system recited in claim 1 wherein said middle proxy and said client end proxy reside on the same machine.

8. The packet switched network communications system recited in claim 1 wherein said middle proxy consists of a plurality of middle proxies, cascaded, allowing a single tunnel to be constructed across multiple firewalls, whereby some of the middle proxies are configured to establish a connection with neighboring middle proxies.

9. A packet switched network communications system as recited in claim 1, wherein the pass through communication tunnel supports multiple client applications multiplexed over a single tcp/ip (transmission control protocol/Internet protocol) connection.

* * * * *

UNITED STATES PATENT AND TRADEMARK OFFICE
CERTIFICATE OF CORRECTION

PATENT NO. : 6,104,716
DATED : Aug. 15, 2000
INVENTOR(S) : Joseph M. Crichton; Peter F. Garvin; Jeffrey W. Staten; Waiki L. Wright It is certified that error appears in the above-identified patent and that said Letters Patent are hereby corrected as shown below:

In column 1, line 5, prior to "BACKGROUND OF THE INVENTION", please insert the following paragraph:

STATEMENT REGARDING FEDERALLY SPONSORED RESEARCH OR DEVELOPMENT
This invention was made with Government support under Agreement F33615-94-2-4447 awarded by the United States Air Force, Wright Laboratory. The Government has certain rights in the invention.

Signed and Sealed this

Seventeenth Day of April, 2001

Attest:

NICHOLAS P. GODICI

*Attesting Officer*   Acting Director of the United States Patent and Trademark Office

UNITED STATES PATENT AND TRADEMARK OFFICE
CERTIFICATE OF CORRECTION

PATENT NO. : 6,104,716
DATED : August 15, 2000
INVENTOR(S) : Joseph M. Crichton et al.

It is certified that error appears in the above-identified patent and that said Letters Patent is hereby corrected as shown below:

Column 1,
Line 5, prior to "BACKGROUND OF THE INVENTION", please insert the following paragraph:
-- STATEMENT REGARDING FEDERALLY SPONSORED RESEARCH OR DEVELOPMENT
This invention was made with Government support under Agreement F33615-94-2-4447 awarded by the United States Air Force, Wright Laboratory. The Government has certain rights in the invention. --.

Signed and Sealed this

Twenty-second Day of November, 2005

JON W. DUDAS
*Director of the United States Patent and Trademark Office*